Sept. 28, 1926.

J. FENYVES 1,601,613

TEASPOON

Filed March 19, 1926

WITNESSES

INVENTOR
Joseph Fenyves.
BY
ATTORNEYS

Patented Sept. 28, 1926.

1,601,613

UNITED STATES PATENT OFFICE.

JOSEPH FENYVES, OF NEW YORK, N. Y.

TEASPOON.

Application filed March 19, 1926. Serial No. 96,017.

The present invention is concerned with the provision of a spoon adapted to serve as a container for tea leaves, as well as serve its usual function as a stirrer.

An object of the invention is to provide a spoon of this character equipped with a sliding cover and so constructed that the cover may be readily manually manipulated by the hand holding the spoon to permit the scooping of tea leaves into the spoon or the discharge of leaves therefrom.

Another object of the invention is to provide a spoon of simple, practical construction which will be highly efficient in use, which will be of attractive appearance and which will lend itself to economical manufacture.

With the above noted and other objects in view, the invention consists in certain novel features of construction and combinations and arrangements of parts, as will be more fully hereinafter set forth and pointed out in the claim. The invention may be more fully understood from the following description in connection with the accompanying drawings, wherein—

Figure 1:
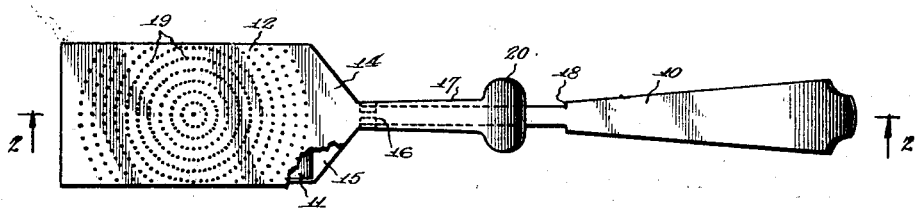
Figure 1 is a plan view of a spoon embodying the invention.
Figure 2:
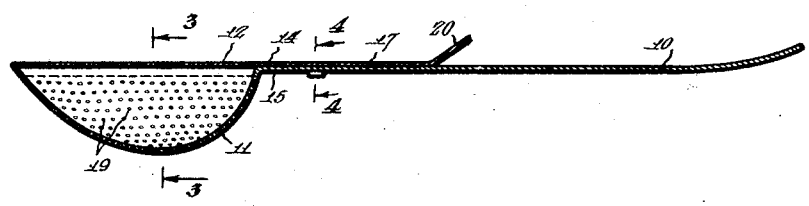
Figure 2 is a longitudinal sectional view therethrough on the line 2—2 of Figure 1.
Figure 3:
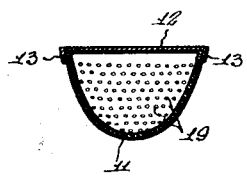
Figure 4:

Figures 3 and 4 are transverse sectional views on the lines 3—3 and 4—4 respectively of Figure 2.

The spoon includes a handle portion 10, which may be of any desired ornamental shape and general appearance, the handle portion being integral with a bowl 11. While the exact shape of the bowl is immaterial, I prefer to utilize a bowl having a rectangular open top for the proper reception and guidance of a generally rectangular cover member 12.

The cover member 12 is formed at its lateral edges with depending flanges 13 embracing the sides of the bowl 11.

The cover at its rear end may include a substantially triangular extension 14 adapted to overlie the similarly shaped end 15 of the handle 10. From the body of the handle to the flared portion 15, the handle is preferably straight and of uniform width for the reception of a pair of downwardly and inwardly turned guide flanges 16 carried by an operating extension 17 of the cover 12. The reduced straight intermediate portion of the handle 10 defines stop shoulders 18 engageable with the shoulders 16 as the cover is slidably retracted. Flanges 16 engage the inclined faces of the handle extension 15 to limit the forward sliding movement of the cover.

Either or both the handle and cover may be formed with a series of apertures 19 so that water may flow freely into and out of the bowl of the spoon when tea leaves are housed therein.

The manner of using the device will be obvious. The bowl of the spoon is partially or completely filled with tea leaves, the cover 12 is slid forwardly to cover the bowl and the spoon is dipped into a cup of hot water and stirred until tea of the desired strength is formed. For convenience in manipulating the sliding cover, I preferably form an offset thumb piece 20 on the handle extension 17 of the cover. A user may thus hold the spoon in one hand and with the thumb of the same hand readily manipulate the thumb piece 20 to slide the cover 12 in either direction, either to scoop dry tea leaves or to discharge used tea leaves.

While I have illustrated a preferred embodiment of the invention, various changes and alterations might be made in the general form and arrangement of parts described without departing from the invention. Hence, I do not wish to limit myself to the details set forth, but shall consider myself at liberty to make such changes and alterations as fairly fall within the spirit and scope of the appended claim.

Having thus described my invention, I claim:

A teaspoon including a bowl, a handle connected thereto and formed with a reduced straight intermediate portion, a sliding cover for the bowl, a handle extension on the cover including flanges embracing the straight portion of the handle, and shoulders on the handle at the end of the reduced portion engageable with the flanges to limit the sliding movement of the cover.

JOSEPH FENYVES.